United States Patent [19]

Kim

[11] Patent Number: 4,996,845
[45] Date of Patent: Mar. 5, 1991

[54] COOLING, HEATING AND POWER GENERATING DEVICE USING AUTOMOBILE WASTE HEAT

[75] Inventor: Yong K. Kim, Seoul, Rep. of Korea

[73] Assignee: Woo Taik Moon, Seoul, Rep. of Korea

[21] Appl. No.: 397,979

[22] Filed: Aug. 24, 1989

[30] Foreign Application Priority Data

Aug. 26, 1988 [KR] Rep. of Korea .................. 88/10890

[51] Int. Cl.⁵ ........................ F01K 23/10; F25B 27/02
[52] U.S. Cl. ...................................... 60/618; 237/12.1
[58] Field of Search .......................... 60/618; 237/12.1

[56] References Cited

U.S. PATENT DOCUMENTS 3,541,783 11/1970 Schmuck ........................... 60/618 X
4,003,344 1/1977 Bradley .............................. 60/618 X
4,334,409 6/1982 Daugas ................................. 60/618
4,366,674 1/1983 Eakman ............................... 60/618
4,873,840 10/1989 Gilliuson ........................ 237/12.1 X

FOREIGN PATENT DOCUMENTS 454396 1/1928 Fed. Rep. of Germany ........ 60/618
2459886 2/1981 France ................................. 60/618
2489418 3/1982 France ................................. 60/618

Primary Examiner—Michael Koczo
Attorney, Agent, or Firm—Marmorek, Guttman & Rubenstein

[57] ABSTRACT

A cooling/heating and power generating device utilizes waste heat from an automobile to produce an auxiliary energy source for driving various accessories such as a cooling/heating apparatus, an electric generator, a super charger and the like. Waste heat is dissipated from the engine by waste gases in an exhaust tube and by a cooling fluid circulating between the engine and a radiator. The inventive cooling/heating and power generating device comprises a heat absorber disposed between the engine and the radiator, a heater mounted on the exhaust tube, and an expansion turbine. A cooling medium is heated in the heat absorber by the cooling fluid of the engine, and in the heater by the waste gases in the exhaust tube. The heated cooling medium drives the expansion turbine thus providing a source of power auxiliary to the engine for driving an electric generator, a super charger, etc. After driving the expansion turbine, the cooling medium is condensed and pumped back to the heat absorber. The cooling medium can also be circulated into a cooling/heating apparatus for cooling or heating the passenger compartment.

7 Claims, 2 Drawing Sheets

COOLING, HEATING AND POWER GENERATING DEVICE USING AUTOMOBILE WASTE HEAT

FIELD OF THE INVENTION

The present invention relates to a cooling, heating and power generating device using the waste heat produced by the engine of an automobile.

BACKGROUND OF THE INVENTION

The progress of the automobile industry in the modern times has made automobiles practically a necessity in the lives of many people, and demands for small automobiles which are economical in fuel consumption, perfect in function and high in driving power have become strong. In order to satisfy such a trend in the demand, desirably the waste heat obtainable from the engine of an automobile should be turned into an auxiliary source of energy for driving the cooler and heater for the passenger compartment, and for driving a generator, a super charger and the like.

Because the energy requirements for auxiliary devices in the present invention is met by the waste heat, the output power of the engine can be used exclusively for driving the automobile, and therefore, an automobile which is economical in fuel consumption, favorable in engine protection, perfect in function, and strong in driving power is provided. Low maintenance costs and low energy consumption are also benefits in such an automobile.

However, in the case of conventional automobiles, the energy requirements for auxiliary apparatuses, such as the cooler, heater, electric generator, super charger and the like, are met by the main output power of the automobile engine, and therefore, the driving efficiency of the engine is greatly reduced. Further, in small cars, an excessive load is imposed on the engine for the reason described above, with the result that the engine is liable to malfunction, the life expectancy of the engine becomes short, and the operating cost for the automobile is increased due to the higher fuel consumption. In an effort to provide a solution for such disadvantages, the prior art has proposed to employ an absorption type cooler utilizing the automobile waste heat, but its bulk is too large and its constitution is much too complicated in consideration of its performance. Further, its mass is too large, and the range of its application is too limited, with the result that it could not produce any practical effect.

SUMMARY OF THE INVENTION

The present invention is intended to give a solution to the above-described problems.

Therefore, it is the object of the present invention to provide a cooling, heating and power generating device using the waste heat from the engine in order to meet the auxiliary energy requirements of an automobile.

In accordance with the present invention, a cooling-/heating and power generating system which is powered by waste heat from an automobile is provided, comprising a heat absorber disposed between the engine and the radiator of an automobile, a cooling medium initially located in the heat absorber, and a heater mounted on the exhaust tube of the engine and connected to the absorber. The cooling medium is heated in the heat absorber by the heated cooling fluid from the engine, and in the heater by the heated exhaust gases in the exhaust tube. The cooling medium drives an expansion turbine and then, after passing through a switching valve, is condensed in a condenser, collected in a liquid receiving tank, and pumped back into the heat absorber. Thus, the expansion turbine is driven by waste heat from the engine and can be used to drive an electric generator, a super charger, a compressor, and the like.

In a preferred embodiment, the cooling medium can also be directed to a cooling and heating apparatus to cool or heat the passenger compartment as conditions require.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
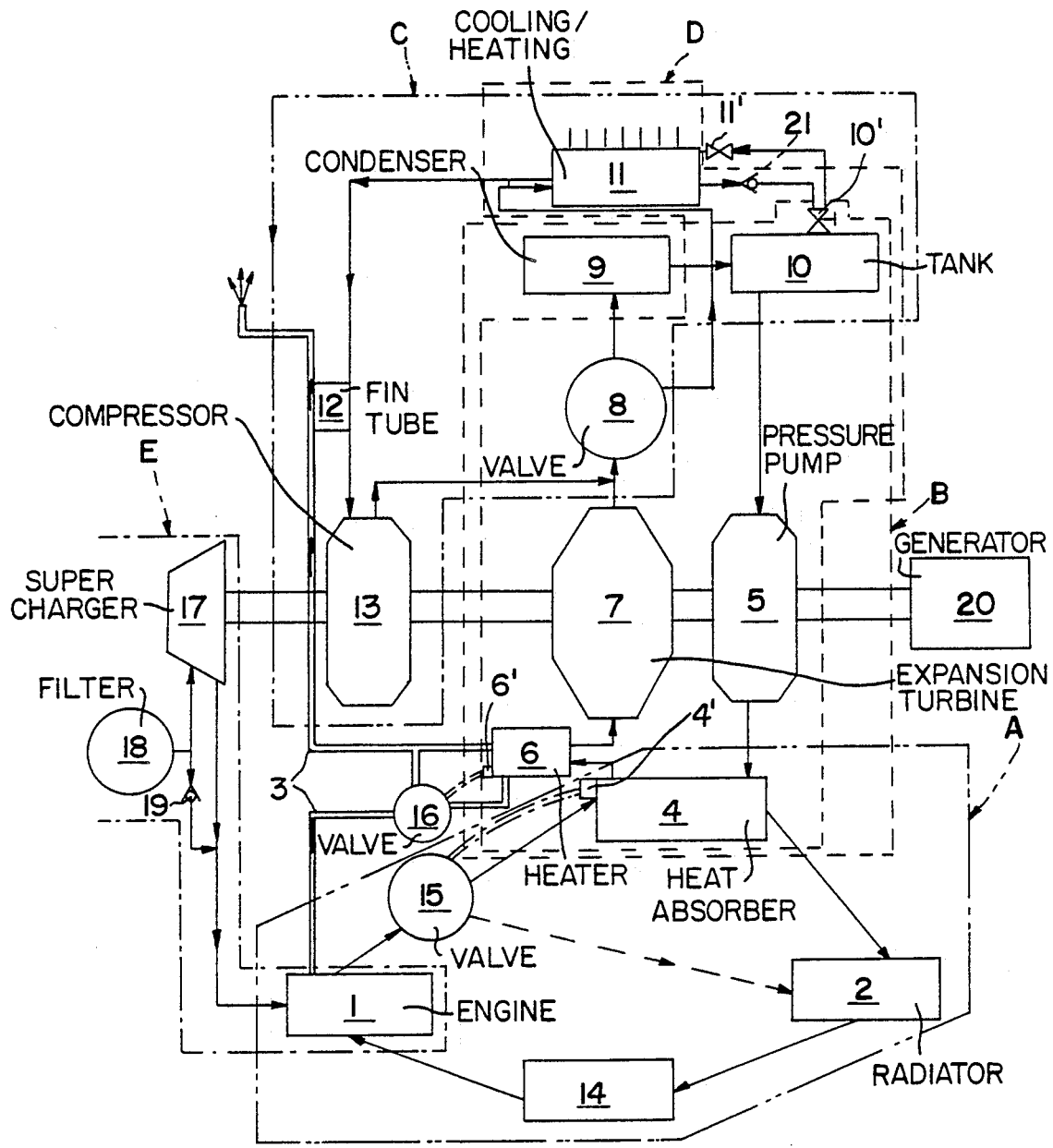
FIG. 1 illustrates schematically the whole system of the device of the present invention.
Figure 2:
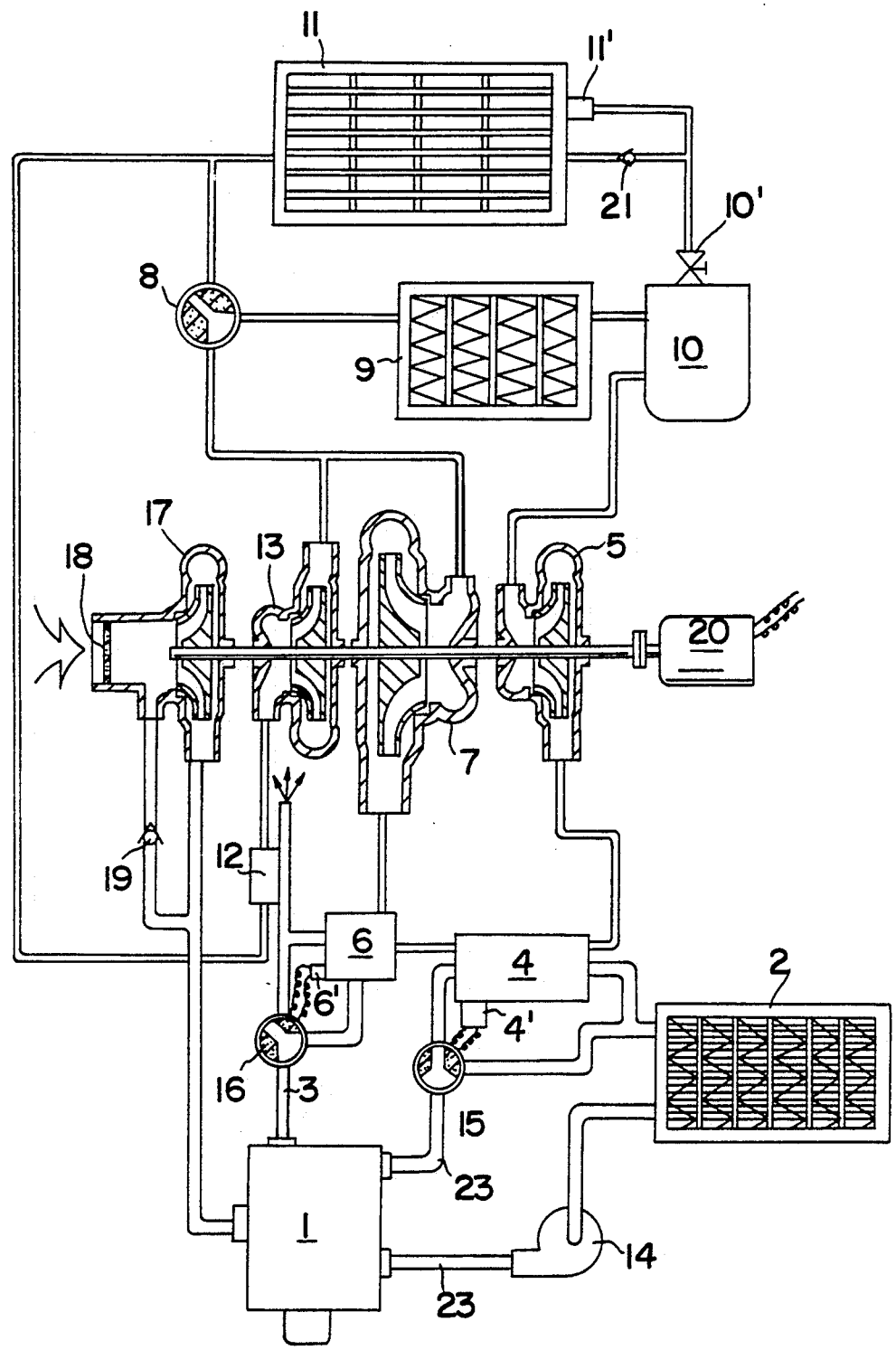
FIG. 2 is a more detailed illustration of the constitution of the device according to the present invention.

Referring to FIGS. 1 and 2, in an ordinary automobile having the inventive cooling, heating and power generating device, a part of the waste heat produced by the engine 1 is released through a radiator 2, and the rest of the waste heat is discharged through an exhaust tube 3. In such an automobile, a heat absorber 4 is installed on a cooling water tube 23 which connects the engine 1 to the radiator 2, while a heater 6 is installed on the exhaust gas discharge tube 3. Further, an expansion turbine 7 is installed for driving a compressor 13, a pressure pump 5, a super charger 17 and an electric generator 20. This expansion turbine 7 is driven by means of a cooling medium which is first heated by the heat absorber 4 and next heated by the heater 6. The cooling medium passes through a switching valve 8, releases heat and is condensed by a condenser 9, and then is stored in a liquid receiving tank 10. Thereafter, the cooling medium is sent to the heat absorber 4 by a pressure pump 5, thereby forming a closed circulation path.

A part of the cooling medium may be sent to an expansion valve 11' where the cooling medium is evaporated by a cooling and heating apparatus 11 to absorb the heat existing in the surrounding space, thereby cooling the passenger compartment. Then the cooling medium passes through a fin tube 12 which is installed on the exhaust tube 3, and while passing through the fin tube 12, the cooling medium is evaporated. Then the evaporated cooling medium is compressed by the compressor 13 which is driven by the expansion turbine 7, and then, the cooling medium passes through the switching valve 8 to be condensed by the condenser 9, and to be received into the liquid receiving tank 10, thereby producing a driving power and a cooling function.

The cooling medium which has driven the expansion turbine 7 after being heated by the heat absorber 4 and the heater 6 can also be sent to the cooling/heating apparatus 11 by means of the switching valve 8 to release heat, thereby heating the passenger compartment. After the release of heat, the condensed cooling medium can be sent to the liquid receiving tank 10. Thus the production of driving power and heating can be simultaneously achieved.

Reference numeral 20 indicates an electric generator driven by expansion turbine 7, and 21 indicates a check valve for preventing a reverse flow of the cooling medium.

The device according to the present invention constituted as above will now be described in operation.

Referring to the block A of FIG. 1, which is the cooling water circulation system, the cooling water for cooling the engine will flow through the heat absorber 4 which is installed on the cooling water tube 23 which in turn connects the engine 1 to the radiator 2. The cooling water having been heated by the engine 1 will heat the cooling medium which is contained in the heat absorber 4, and then, the cooling water will be sent to the radiator 2 where it is cooled to be sent to the engine again by the function of a circulation pump 14, the cooling water thus being forcibly circulated. If the cooling medium within the heat absorber 4 is heated too much, and thus, if the pressure is raised above a certain predetermined reference value, then an adjusting valve 15 which is operated in association with a sensor 4' will send the cooling water from the engine directly to the radiator 2 through a bypass 24, thereby controlling the flow amount of the cooling water through the heat absorber 4, and also controlling the heated level of the cooling medium.

If the cooling medium which is first heated at the heat absorber 4 is not sufficiently heated, then the cooling medium is again heated by the heater 6 installed on the exhaust gas tube 3. If the cooling medium is heated too much by the heater 6 above a certain predetermined reference value, then the adjusting valve 16 will adjust the flow amount of the exhaust gas flowing through the heater 6 in accordance with the output of the sensor 6'.

Thus, after absorbing the waste heat produced from the engine, the cooling medium having a high temperature and a high pressure will drive the expansion turbine 7 of the power generating system B by being expanded in the expansion turbine 7 to generate auxiliary power. The cooling medium will then be sent through the switching valve 8 to the condenser 9 where it releases heat and is condensed to be stored in the liquid receiving tank 10.

The stored cooling medium will be forcibly sent back to the heat absorber 4 by the pressure pump 5, thus circulating continuously and generating power continuously. The power obtained in this way is used as the auxiliary energy source for driving the compressor 13, the super charger 17, the electric generator 20 and the like.

Meanwhile, if it is desired to cool the passenger compartment in summer seasons, the valve 10' attached to the liquid receiving tank 10 of the power generating system B should be opened, so that a part of the cooling medium in the tank 10 will be sent through the expansion valve 11' to the cooling/heating apparatus 11 of the car interior as shown by the cooling cycle system C. The cooling medium introduced into the apparatus 11 and expanded therein absorbs the heat existing in the surrounding space, thereby cooling the car interior. If a vapor saturation state is reached, then it is made to become an excessively heated vapor state by means of the fin tube 12 provided on the exhaust gas tube 3. It is then sent to the switching valve 8 of the power generating system B by means of the compressor 13, so that it together with the cooling medium from the expansion turbine 7 should be condensed by the condenser 9 to be received into the liquid receiving tank 10. Thus the cooling of the car interior is carried out simultaneously with the auxiliary power generation.

Alternatively, if it is desired to heat the car interior in winter seasons, as shown in the heating cycle D, the cooling medium which has driven the expansion turbine 7, after being heated by the heat absorber 4 and the heater 6, is sent directly to the cooling/heating apparatus 11 by means of the switching valve 8, so that heat should be released from the cooling medium to heat the car interior. The cooling medium, having condensed after heating the car interior, is sent back through the check valve 21 to the liquid receiving tank 10 of the power generating system B. Thus the heating of the car interior may also be done simultaneously with the auxiliary power generation. If the car interior is excessively heated, then the compressor 13 is activated to send a part of the cooling medium through the switching valve 8, condenser 9, fin tube 12 and the compressor 13, so that the excessive heat should be released through the fin tube 12.

Meanwhile, if it is desired to supercharge the engine, then, as shown in the super charger activation system E, a super charger 17 is installed, and is driven by the power generated from the expansion turbine 7. In the initial stage when the expansion turbine is not operated, air is introduced into the engine from a filter 18 through the check valve 19, and after the expansion turbine 7 is operated, the supercharging is achieved by the super charger 17 which is driven by the power produced by the expansion turbine 7.

As described above, the present invention uses the waste heat from the engine to cool or heat the car interior and to generate power for use as an auxiliary energy source, with the result that the engine is protected, that the same effect as the increasing of the engine power is realized, and that fuel can be saved. Further, the device of the present invention is simple in structure and light in weight, while its effect is outstanding.

While the invention has been described by reference to a specific embodiment this was for purposes of illustration only and should not be construed to limit the spirit or the scope of the invention.

I claim:

1. A cooling/heating and power generating system which is powered by waste heat from an automobile engine, comprising an engine which produces useful energy and waste heat, said waste heat being dissipated from said engine by waste gases in an exhaust tube and by a cooling fluid, a radiator connected to said engine and receiving said cooling fluid from said engine, a heat absorber disposed between said engine and said radiator and receiving said cooling fluid prior to its delivery to said radiator, said heat absorber including a cooling medium in thermal contact with and being heated by said cooling fluid, a heater mounted on said exhaust tube and connected to said heat absorber, said heater receiving said cooling medium from said heat absorber, said cooling medium being in thermal contact with and being heated by said waste gases in said exhaust tube, an expansion turbine connected to said heater and receiving said cooling medium from said heater, said expansion turbine being driven by said cooling medium heated in said heat absorber and said heater, a condenser connected to said expansion turbine and receiving said cooling medium therefrom, said cooling medium being condensed in said condenser, first valve means disposed between said expansion turbine and said condenser for controlling the delivery of said cooling medium to said condenser, a liquid receiving tank connected to said condenser and receiving said condensed cooling medium from said condenser, a pump connected to said liquid receiving tank and pumping said condensed cooling medium back to said heat absorber, said heat absorber, heater, expansion turbine, condenser, liquid receiving tank, and pressure pump forming a circulation loop for said cooling medium, said expansion turbine being driven by waste heat from said engine and being a source of power auxiliary to said engine, said system further comprising a cooling circuit for cooling said automobile comprising a cooling/heating apparatus connected to said liquid receiving tank and receiving said condensed cooling medium from said liquid receiving tank, a fin tube connected to said cooling/heating apparatus and evaporating said condensed cooling medium after it has passed through said cooling/heating apparatus, a compressor connected to said cooling/heating apparatus and located downstream of said fin tube, said compressor compressing said evaporated cooling medium and delivering said evaporated cooling medium to said first valve means for reintroduction into said circulation loop, and second valve means disposed between said liquid receiving tank and said cooling/heating apparatus for controlling the delivery of said condensed cooling medium into said cooling circuit.

2. The system of claim 1 wherein said pump is driven by said expansion turbine.

3. The system of claim 1 further comprising a compressor driven by said expansion turbine.

4. The system of claim 1 further comprising a super charger driven by said expansion turbine.

5. The system of claim 1 further comprising an electric generator driven by said expansion turbine.

6. The system of claim 1 wherein said pump is driven by said expansion turbine so that said cooling medium is continuously circulated in said circulation loop.

7. The system of claim 1 further comprising a heating circuit for said automobile comprising a line connecting said cooling/heating apparatus directly to said first valve means, said first valve means being a two-way valve for alternately introducing said cooling medium into said condenser or into said cooling/heating apparatus thereby bypassing said condenser and heating said automobile.

* * * * *